United States Patent [19]

Mozley et al.

[11] Patent Number: 4,597,505
[45] Date of Patent: Jul. 1, 1986

[54] RUPTURE DISC WITH SELECTIVELY POSITIONED INITIAL BUCKLING

[75] Inventors: Robert M. Mozley, Raytown; Bryce H. Wilson, Kansas City, both of Mo.

[73] Assignee: Continental Disc Corporation, Kansas City, Mo.

[21] Appl. No.: 598,457

[22] Filed: Apr. 9, 1984

[51] Int. Cl.⁴ .................. F16K 17/16; F16K 17/40
[52] U.S. Cl. .................................. 220/89 A; 137/68.1
[58] Field of Search .......................... 220/89 A, 268; 137/68 R, 68.1

[56] References Cited

U.S. PATENT DOCUMENTS

| | | |
|---|---|---|
| 2,047,049 | 7/1936 | Allen . |
| 2,225,220 | 12/1940 | Huff . |
| 2,553,267 | 5/1951 | Nedoh . |
| 2,556,858 | 2/1952 | Parsons . |
| 2,576,431 | 11/1951 | White . |
| 2,656,950 | 10/1953 | Coffman . |
| 2,663,458 | 12/1953 | MacGlashan, Jr. . |
| 2,694,503 | 11/1954 | Young et al. . |
| 2,716,506 | 8/1955 | Fike . |
| 2,766,904 | 10/1956 | Philip ..................... 220/89 A |
| 2,953,279 | 9/1960 | Coffman . |
| 3,005,573 | 10/1961 | Dawson et al. . |
| 3,029,987 | 4/1962 | Gronemeyer . |
| 3,039,482 | 6/1962 | Goldberg ................ 220/89 A X |
| 3,087,643 | 4/1963 | Smirra . |
| 3,091,359 | 5/1963 | Wood . |
| 3,109,553 | 11/1963 | Fike et al. . |
| 3,109,554 | 11/1963 | Porter et al. . |
| 3,121,509 | 2/1964 | Porter . |
| 3,123,250 | 3/1964 | Lemmer . |
| 3,169,658 | 2/1965 | Porter . |
| 3,195,769 | 7/1965 | Miller . |
| 3,228,334 | 1/1966 | Oss . |
| 3,257,026 | 6/1966 | Taylor . |
| 3,292,826 | 12/1966 | Skplanalp . |
| 3,294,277 | 12/1966 | Wood . |
| 3,327,894 | 6/1967 | Ferris . |
| 3,330,440 | 7/1967 | Summers et al. . |
| 3,463,351 | 8/1969 | Mills . |
| 3,478,761 | 11/1969 | Fox . |
| 3,484,817 | 12/1969 | Wood . |
| 3,612,345 | 10/1971 | Fike, Jr. . |
| 3,623,495 | 11/1971 | Erb . |
| 3,635,234 | 1/1972 | Dawson . |
| 3,658,206 | 4/1972 | Barbier . |
| 3,704,807 | 12/1972 | Lidgard . |
| 3,709,239 | 1/1973 | Morck, Jr. . |

(List continued on next page.)

FOREIGN PATENT DOCUMENTS

| | | |
|---|---|---|
| 504686 | 7/1954 | Canada ............................ 220/89 A |
| 875337 | 7/1971 | Canada . |
| 644572 | 1/1936 | Fed. Rep. of Germany . |
| 578008 | 12/1942 | United Kingdom . |
| 1248872 | 10/1971 | United Kingdom . |

*Primary Examiner*—Allan N. Shoap
*Attorney, Agent, or Firm*—Litman, Day and McMahon

[57] ABSTRACT

A rupture disc system comprises a rupture disc including a dome portion and a flange portion interconnected by a transition region and a mounting mechanism for mounting the rupture disc by the flange portion thereof in a pressure relieving vent. The rupture disc includes a thickness reducing groove at least partially circumferentially surrounding the dome portion and located in the transition region thereof. The rupture disc is of the reverse buckling type and the groove does not completely surround the dome portion so as to define a tab or hinge within that part of the transition region which is ungrooved or not as deeply grooved as a remainder of the transition region. The system includes a support structure for the disc which supports the transition region except in a sector adjacent the dome portion where initial failure is desired. The location of the unsupported sector is approximately centered relative to the tab or hinge. In addition, the disc support structure preferably comprises a downstream ring member having an arcuate projection which extends into the vent. The arcuate projection is located so as to be relatively close to and so as to align with the tab or hinge such that the dome portion wraps about the projection when reverse buckling and rupture occurs.

16 Claims, 10 Drawing Figures

U.S. PATENT DOCUMENTS

| | | |
|---|---|---|
| 3,722,734 | 3/1973 | Raidl, Jr. . |
| 3,777,772 | 12/1973 | Arnold et al. . |
| 3,815,779 | 6/1974 | Ludwig et al. . |
| 3,834,580 | 9/1974 | Ludwig et al. ................... 220/89 A |
| 3,834,581 | 9/1974 | Solter et al. . |
| 3,845,879 | 11/1974 | Dernbach et al. . |
| 3,857,288 | 12/1974 | Neugebauer . |
| 3,901,259 | 8/1975 | Banbury . |
| 3,997,076 | 12/1976 | Jordan ................................. 220/268 |
| 4,018,178 | 4/1977 | Klein et al. ..................... 220/268 X |
| 4,043,481 | 8/1977 | Herbst . |
| 4,059,858 | 11/1977 | Lambel et al. . |
| 4,072,160 | 2/1978 | Hansen ........................ 220/89 A X |
| 4,073,402 | 2/1978 | Wood . |
| 4,079,854 | 3/1978 | Shaw et al. . |
| 4,119,236 | 10/1978 | Shaw et al. . |
| 4,122,595 | 10/1978 | Wood et al. . |
| 4,126,184 | 11/1978 | Hinrichs . |
| 4,139,005 | 2/1979 | Dickey . |
| 4,146,047 | 3/1979 | Wood et al. . |
| 4,158,422 | 6/1979 | Witten et al. ..................... 220/89 A |
| 4,207,913 | 6/1980 | Fike et al. . |
| 4,211,334 | 7/1980 | Witten et al. . |
| 4,235,347 | 11/1980 | Cothier et al. . |
| 4,236,648 | 12/1980 | Wood et al. ..................... 220/89 A |
| 4,269,214 | 5/1981 | Forsythe et al. . |
| 4,278,181 | 7/1981 | Wood et al. . |
| 4,301,938 | 11/1981 | Wood et al. . |
| 4,342,988 | 8/1982 | Thompson et al. . |
| 4,347,942 | 9/1982 | Jarnberg et al. . |
| 4,385,710 | 5/1983 | Kurihara et al. . |
| 4,394,926 | 7/1983 | Ou et al. . |
| 4,416,388 | 11/1983 | Mulawski ........................ 220/207 X |

RUPTURE DISC WITH SELECTIVELY POSITIONED INITIAL BUCKLING

BACKGROUND OF THE INVENTION

The present invention relates to safety pressure relief devices and, in particular, to rupture discs, especially reverse buckling rupture discs, and also to support structure of such discs for producing failures of such discs which are highly predictable.

Relief devices of the type commonly known as rupture discs have been utilized by industry for many years to provide a safety mechanism to relieve excessive pressure from an overpressurized system or vessel in a reliable manner. The rupture disc is most frequently placed in a vent for a pressure vessel or the like so as to prevent flow of fluid through the vent until the disc ruptures. Through the years, numerous improvements have been made in the rupture disc concept in order to reduce the cost and to improve the reliability of the disc.

A specific type of disc normally referred to as a reverse buckling rupture disc has also been utilized for a number of years and functions under the principle that a dome is formed in the disc which is positioned in the vent such that the dome points toward or faces the pressure side of the vent, that is, the convex side of the dome faces the internal portion or upstream side of the vent wherein pressurized fluid is likely to produce an overpressure which would be dangerous or destructive if not relieved.

One advantage of reverse buckling type discs is that systems being protected by the discs can be operated at pressures relatively close to the bursting pressure of the disc and with pressure oscillation without producing fatigue and failure which occurs in many forward bursting discs when operated for long periods of time near the rated bursting pressure of such discs. The dome, when fluid pressure reaches a preselected pressure for which the dome was designed to rupture, starts to collapse, that is, the column or arch of the dome on one side thereof starts to buckle.

In the rupture disc industry it is commonly believed that, as the arch on one side of the dome starts to collapse, a buckling type wave typically propagates across the surface of the dome to the opposite side of the dome where total collapse eventually occurs. This buckling wave tends to create a whiplash effect on the side of the dome opposite the initial buckling so that the dome at this location is rather violently urged in the direction to which the concave portion of the dome faces (that is, the downstream side of the vent). Many of the reverse buckling rupture discs include knife blades positioned on the concave side of the dome which are normally in spaced relationship to the dome but which are engaged by the dome upon buckling. The knives cut the dome, typically in such a pattern so as to cause petals which are held to a flange portion of the disc by tab regions or the like.

Knife blade assemblies for reverse buckling rupture discs add substantially to the cost of such discs and are subject to failure due to corrosive activities of the fluids within the vent system, damage during handling or simply because a mechanic forgets to install the knife assembly with the consequence that the bursting pressures of the discs are many times the rated pressures of such discs. It has, therefore, been a goal of the rupture disc industry to produce a disc of the reverse buckling type which does not require knife assemblies, but which is highly reliable.

One reverse buckling rupture disc, which was specifically designed to rupture without the use of knife blades, incorporates the concept of placing grooves, scores or etchings, especially in criss-cross or circular patterns on concave or convex faces of a reverse buckling rupture disc dome. A dome of this type can be seen in U.S. Pat. No. 3,484,817 of Wood. In the Wood device the rupture disc dome buckles, reverses and fractures along the lines of weakness produced by the grooves so as to form petals which are held to the remainder of the rupture disc assembly.

There has been a continuing desire in the rupture disc industry to produce new types of reverse buckling rupture discs which have properties that make them especially suitable for specific purposes, more cost efficient, and/or make the disc more reliable and consistent in bursting pressure. In particular, new reverse buckling rupture discs are desired which will function without the need for knife blades for cutting the disc on reversal, yet which will remain highly reliable so as to relieve within a relatively close tolerance of the predetermined rupture pressure necessary to insure positive protection for the vessels or the like which are protected by the disc.

There has also been a problem associated with some reverse buckling rupture discs which do not have knife blade assemblies in that the disc can accidentally be inserted into the vent system with the concave side facing in the wrong direction. Therefore, it is important that the rupture disc relieve in either direction, although the relief in the backward direction may normally be at a higher pressure.

There is also a problem in some systems with portions of the rupture disc being entrained with the fluid being relieved. Pieces of rupture discs can cause damage to pumps and the like if they are allowed to freely break away from the remainder of the rupture disc assembly upon rupture. Therefore, it is important that the rupture disc dome or petals of the rupture disc dome remain intact after rupture and that they remain attached to a remainder of the disc.

OBJECTS OF THE INVENTION

Therefore, the principal objects of the present invention are: to provide a rupture disc system which is highly reliable such that the rupture disc associated with the system ruptures within a relatively close range on either side of a preselected pressure to protect a vessel or the like from overpressure; to provide such a system including a reverse buckling rupture disc which does not require a knife assembly to open; to provide such a reverse buckling rupture disc which will reliably rupture at a first given pressure when fluid pressure is applied to the convex side thereof and at a second given pressure, for example 1.5 times the first given pressure, when fluid pressure is applied to the concave side thereof; to provide such a rupture disc including hinge or tab means for retaining the disc or portions of the disc with the remainder of the rupture disc assembly after rupture of the disc; to provide a structural configuration for the rupture disc system which ensures that the disc will first fail on the side of the disc associated with the hinge or tab and therefore first tear between a dome and flange portion of the disc opposite such hinge or tab and thereafter tear to the edge of said tab leaving the hinge or tab intact; to provide a support structure for the disc which entirely supports a transition region of the discs except for a sector of such transition region which is adjacent that position of the dome wherein initial failure is desired, especially so as to initially trigger failure or buckling of the rupture disc adjacent the tab or hinge; to provide such a disc utilizing an arcuate projection into the vent assembly opposite the concave side of such disc and spaced closely adjacent the hinge or tab region of the disc for the dome to wrap about after rupture thereof; to provide such a disc having a groove or etching in the transition region between the dome and the flange portion of the disc; to provide such a groove or etching which is approximately two-thirds the depth of the transition region; to provide such a disc having a groove which extends only partially about the transition region and defines the tab or hinge region thereof within the portion of the transition region wherein the grooving or etching does not occur; to provide such a system including support rings on either side of the flange portion of the rupture disc which cooperate with the disc to ensure that the grooved area in the transition region is supported on the concave or downstream side of the rupture disc dome except in the sector associated with the initial buckling and that the rupture disc is also free to fracture toward the convex side thereof without being held in place or restricted from buckling by the support ring on that side after rupture; and to provide an overall rupture disc system which is relatively economical to manufacture, convenient to install, highly reliable, and particulary well adapted for the intended usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A rupture disc assembly is provided which includes a domed or pre-bulged rupture disc of the type utilized to protect pressure vessels or the like from over pressure. The rupture disc is preferably a reverse buckling disc, but certain of the improvements discussed hereinafter may be utilized in conjunction with other types of discs. The improvements discussed herein derive from experimentation directed to finding a rupture disc which would not only consistently relieve at a preselected pressure (normally the preselected pressure is approximately ⅔ of the maximum rated rupture pressure associated with the vessel or other processing equipment to be protected by the disc), but also would relieve at a second preselected pressure, if the rupture disc were inadvertently installed backward (such second pressure for example being approximately the maximum rated pressure of the vessel, again for example, at a pressure 1.5 times the first preselected pressure).

It was especially desired to produce a reliable reverse buckling rupture disc which would predictably rupture at such a first preselected pressure, and which would also rupture at said second preselected pressure if the disc were inadvertently placed in the vent line backward. It was further desired that the disc should rupture without the aid of a knife assembly, as knife assemblies are expensive and may be susceptible to corrosion, damage and the like, which produces failure in such knives, or the knife blades may be accidentally left out of the assembly during installation.

With this in mind, numerous structures were tested but failed to have the predictable and consistent rupture pressures required of such rupture disc devices. Contrary to conventional thought in the rupture disc industry against making any modifications in the region of the reverse buckling rupture disc between dome and flange portions (normally referred to as a transition area or region), other than to change the radius thereof, it was discovered that placing of a groove within the transition area produced suitable and highly repeatable release pressures in either direction.

A full circle groove in the transition area of a reverse buckling rupture disc produced highly repeatable results when the groove was manufactured in a consistent fashion. It is noted that the groove may affect the bursting pressure of the disc as compared to the disc before the groove is added, however, the important result with the groove, as with other improvements discussed herein, is that the bursting pressure be consistently reproduceable in successive discs which are modified or produced in the same manner.

It was found that a satisfactory groove could be made by placing a die with a knife edge under pressure against the transition area and allowing the knife edge to penetrate the area. It was found that a particular knife blade had to be tested with each different disc to see if that blade was compatible with the disc. For example, flatter or oval edged knife blades were found to be suitable for discs which are thicker, while more V-shaped knife blades with a radius from about 0.003 inches to 0.015 inches on the edge were found to be better for relatively thinner discs. One suitable V-shaped knife blade for certain rupture discs was found to be a blade having in cross section a central axis which is perpendicularly aligned with the surface of the flange portion of the disc when forming the groove, sides of the blade which diverge generally from the central axis and specifically from a point or knife edge at angles of approximately thirty degrees, and an edge which has a radius of approximately 0.005 inches. The radially inner side of the knife blade is preferably placed close to or adjacent the domed portion of the disc and it is not unusual for the radius of curvature of the dome at its juncture with the transition region to change during manufacture of the groove. While the exact depth of penetration of the knife blade into the transition area varies with the desired bursting pressure in each direction, thickness of the disc and with materials of construction, it was found in some discs that a groove depth of approximately two-thirds the thickness of the transition area is often quite suitable for producing the effect of bursting at the first preselected pressure in one direction and bursting at a pressure approximately 1.5 times the first preselected pressure in the opposite direction, if the disc were inadvertently installed backward. A groove depth of 40 to 50% of the disc normal thickness was often found to be sufficient to produce tearing upon buckling in most discs. However, it is specifically noted that depths of the groove cited herein are for purposes of example and that the depth required for a certain disc (that is a specific disc having a fixed thickness, material of construction, temper, etc.) to relieve at a certain pressure can only best be determined by experimentation. It is important that the reverse buckling rupture disc with the groove in the transition area be supported on the downstream side thereof (that is, on the side of the disc where fluid pressure would normally not be applied and also on what would normally be the concave side of the dome portion of the disc) except as noted below. The structure supporting the rupture disc in this manner preferably extends along substantially the entire portion of the transition area, especially where grooved except where initial buckling of the adjacent dome is desired. When reference is made herein to the groove being "in the transition area", it is meant that it is placed on the disc in such a manner as it would at least touch the original transition area. Actually, a modified transition region is normally formed when the groove is placed on the disc.

While the full circle grooving in the transition region works well for reverse buckling rupture discs wherein it does not matter if fragments of the ruptured disc are carried downstream in the vent line after the rupture disc bursts, it is often desirable to retain the rupture disc as an integral, although ruptured, unit even after bursting. For this, a hinge or tab is placed between the dome portion and the flange portion of the rupture disc. One method to provide such a tab, is that grooving is applied to the transition region in a partial circumferential manner so as to define such a tab region by that portion of the transition region which has not been grooved. For example, a thirty degree arc of the transition region may be left ungrooved while a continuous 330 degree remaining arc is grooved. Tabs of larger and smaller area have been found to be functional and the optimum tab arc depends on the particular disc.

While producing a tab region by not grooving a certain portion of the disc on the transition region functions well for certain discs and utilizations, it is found that normally the larger the ungrooved area, then the more unpredictable the bursting pressure of the disc becomes. In addition, in certain discs the violence of the rupture will cause a tear through such a tab region. It was found that a disc with a more reliable bursting pressure and yet with a tab region could be manufactured by utilizing a die with a generally continuous or full 360 degree arc knife, by changing the characteristics of the knife in the region desired to be left as a tab.

In particular, a portion of the knife edge is removed corresponding to the desired size of the tab, such that during the grooving process the knife does not form a groove in that portion where the edge is modified or at least does not form as deep a groove in the projected tab portion. The knife blade does apparently change the radius of curvature of the transition region adjacent the projected tab area even though it is not as deeply grooved, if at all; and, while applicant does not wish to be restricted to a certain theory of operation, it is believed that this change in radius modifies the characteristics of the disc in such a manner as to produce a disc which relieves at a more predictable pressure. Preferably, the knife blade is placed on the disc flange portion upstream flat surface next to the dome portion, and thereafter pressure is applied to the blade to urge it to penetrate into the flange portion along the transition region and, in particular, in a manner so as to penetrate generally perpendicular to the flat sides of the flange portion. It is noted that the maximum depth of penetration of the knife blade in the transition region is preferably accurately controlled by use of stops or the like.

It is generally believed in the industry that reverse buckling rupture discs tend to collapse or buckle on one side of the dome at which time a buckling type wave propagates out over the top of the dome to the opposite side of the dome. As the wave hits the opposite side of the dome there is a whiplash effect which violently thrusts the side of the dome associated with such whiplash in a downstream direction and tears the dome from the flange portion, which tear then propogates back around the disc to the side toward where the buckling first occurred. This whiplash buckling effect is often sufficiently strong to break the tab region of the rupture disc, if failure of the disc first occurs opposite such tab. Therefore, in order to provide even more reliability to the tab in order to prevent fragmentation of the disc, it is desired to first initiate failure of the disc adjacent the tab region so that the whiplash effect will occur opposite the tab region.

A suitable technique for inducing failure of the disc first in the area of the dome in close association with the tab region has been found to comprise providing downstream structural support for the disc which supports the entire transition area except for that area of the transition region adjacent (that is coextensive with) the tab region or adjacent a portion of the tab region wherein initial buckling of the dome is desired. One suitable device for supporting the transition region has been found to be a support ring with a sector missing so as to align with or be adjacent the center of the tab region of the disc. Normally the missing sector, actually an aperture axially passing completely through the support ring or a depression in the support ring, may range from as little as a few degrees of arc to as wide as the tab region in arc. Again testing must be utilized to determine at what pressure a particular disc will rupture when configured with a support ring having a particular sector missing; however, when all parts are essentially identical for successive discs systems, then disc failure pressure is also highly consistent.

Finally, it has been found that the force associated with rupture of certain discs will tear the tab region, even when initial failure of the disc is on the side of the dome associated with the tab region. It has been found that, if an arcuate projection extending radially inward from the side of the vent below the tab region is provided for the dome to wrap about upon rupture while the tab is still intact, then the tab region is less likely to tear. When it is indicated herein that the projection is below or aligned with the tab region, it is meant that the projection should be downstream in the vent relative to the unruptured disc, on the concave side of the rupture disc prior to rupture, and could refer to such a projection which was actually spacially "above" the disc but still downstream from same. In particular, the projection should be aligned such that, as the dome pivots about the hinge formed by the tab region upon rupture, the dome engages the projection. Projections which have a linear or chordal engaging surface have been previously used in the art, but have been found to sometimes allow the dome to continue to rip along the tab region and, therefore, were not generally found to be satisfactory for the disc described herein. On the other hand, projections which are relatively arcuate in nature and project radially inward from the side of the vent, especially those that are almost circular or nearly approximating the curvature of the dome were found to be most suitable. Preferably, the support ring missing sector is positioned to be centered between the junctures of the projection with the remainder of the ring.

A suitable projection for certain uses was found to be one that is generally flat on sides thereof facing toward and away from the rupture disc prior to bursting and which has the facing surface in a plane which is generally adjacent a plane defined by the downstream side of the flange portion. Further, the example projection has a thickness of approximately 0.060 inches (although in higher pressure systems and/or when the missing sector is sufficiently large to weaken the projection, this may be doubled or tripled to prevent bending when the disc ruptures), has a radially inwardly projecting edge which is almost circular, and has a radius roughly between one-fourth and one-fifth the radius of the inner diameter of the disc flange portion. The example projection being attached to and extending along a downstream support ring for the disc through an arc length which is preferably slightly longer than the arc length associated with the tab region. For example, if the arc of the tab region is approximately 30 degrees, then the projection would extend for an arc of approximately 34 degrees. In this manner, the transition area of the disc tears along the groove upon rupture to the tab region and such that the edges of the dome next to the tab region do not align exactly with the projection but tend to wrap thereabout so as to further secure the ruptured dome to the projection until a maintenance crew can change the disc.

While the improvements discussed above have been described especially in terms of reverse buckling rupture discs, certain features of the improvements can be utilized in conjunction with other types of conventional rupture discs. In particular, it is foreseen that a circumferential groove may be utilized in a transition region of a conventional forward failure rupture pre-bulged disc to allow a failure if the disc is inserted backward and may be utilized in conjunction with typical grooves, slits or other devices on the dome of such forward acting disc which grooves, etc. cause failure in a normal forward direction.

It is noted that in some of the drawings, the scale of certain features have been exaggerated, where necessary, in order to show details thereof. This is especially true of the thickness of the various rupture discs relative to the assembly associated therewith. The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
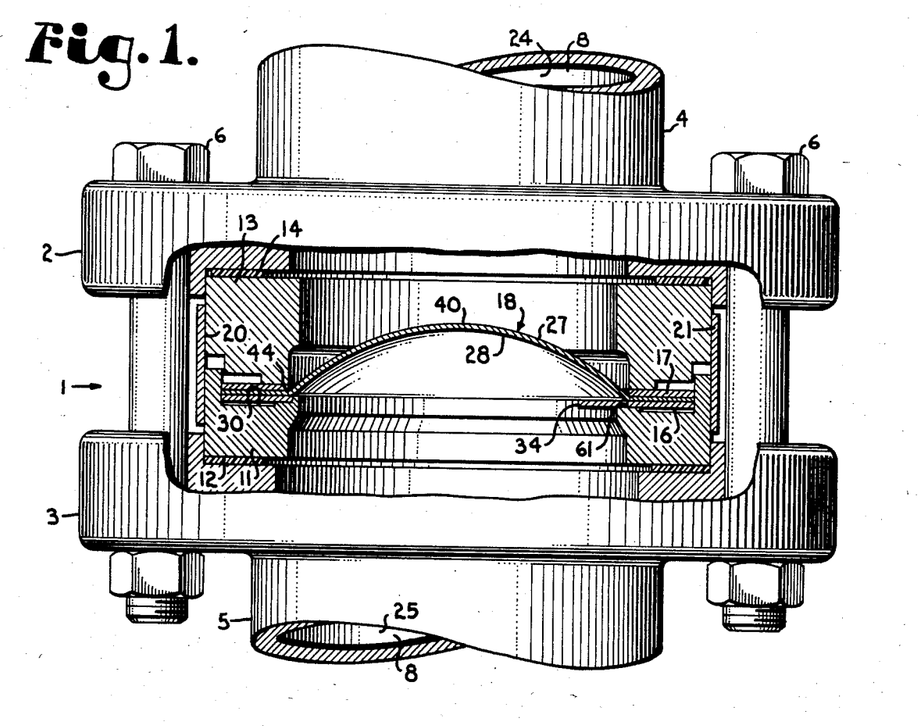
FIG. 1 is a side elevational view of a rupture disc assembly according to the present invention installed in a vent pipe between support rings with portions broken away to illustrate details of the assembly.
Figure 2:
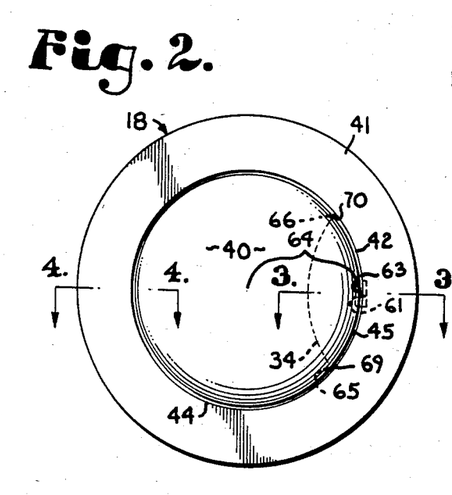
FIG. 2 is a top plan view of the rupture disc and support rings of FIG. 1 with portions of the lower support ring shown in phantom.
Figure 5:
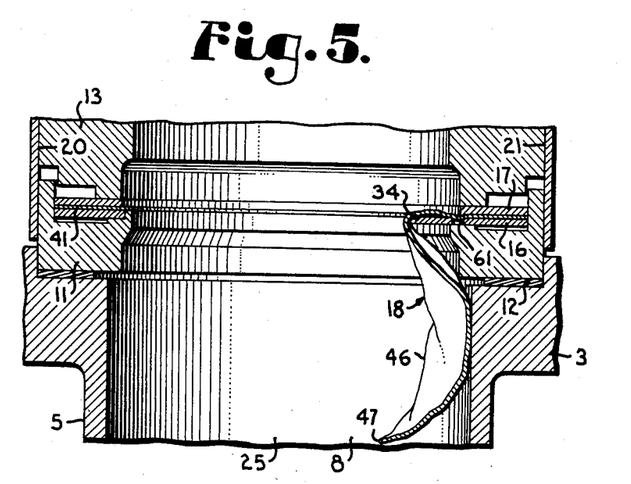
FIG. 5 is a fragmentary cross-sectional view of the rupture disc assembly shown in FIG. 1 after rupture of the rupture disc.

The reference numeral 1 generally designates a safety pressure relief assembly according to the present invention. The assembly 1, as is best seen in FIG. 1 and in the exploded view in FIG. 5, is secured between opposite flanges 2 and 3 which are end flanges of vent pipe sections 4 and 5 respectively and which are securely held together so as to clamp the assembly 1 therebetween by a plurality of circumferentially spaced bolts 6. The vent pipe sections 4 and 5 form part of a vent system including an interior channel 8. The vent system includes an upstream portion which is associated with vent pipe section 4 and which joins with a pressure vessel or the like (not shown) to be protected by the vent system and would also normally be the side of the vent system to be positively pressurized by fluid therein. Vent pipe section 5 discharges to a safe location (not shown) to relieve excess pressure communicating therewith from vent pipe section 4 upon relief by the assembly 1. The assembly 1 comprises a downstream support structure 11 (FIG. 5), a downstream seal member 12, an upstream support structure 13, and an upstream seal member 14. The assembly 1 further comprises a downstream support ring 16, and upstream support ring 17, and a reverse buckling rupture disc 18.

When the assembly 1 is in use, seal member 14, the support structure 13, the support ring 17, the rupture disc 18, the support ring 16, the support structure 11, and seal member 12 are in sequential, abutting and snug relationship with respect to one another so as to be generally resistant to fluid pressure leaks in a radially outward direction, this configuration being shown in FIG. 1. The assembly 1 is retained together by keeper brackets 20 and 21 which are secured to both of the support structures 11 and 13 by suitable bolts (not shown) or the like received in threaded apertures 23. There is a generally unrestricted upstream channel portion 24 extending from the upstream or convex side 27 of the rupture disc 18 to the vessel or the like being protected by the assembly 1 and a generally unrestricted downstream channel portion 25 extending from a downstream or concave side 28 of the rupture disc 18. The downstream support structure 11 includes an annular seat 30 for the support ring 16 and further includes an annular boss 31 which is positioned radially inward from the seat 30. The boss 31 extends circumferentially in conjunction with the seat 30 except for a sector 32 of the seat which angularly aligns with an arcuate projection 34 on the support ring 16.

Attention is directed to the support rings 16 and 17 and the rupture disc 18, such as are shown in greater detail in FIGS. 2, 3, 4, 6, and 7. The rupture disc 18 is of the type commonly referred to as a reverse buckling rupture disc having a central pre-bulged dome 40, a generally planar flange portion 41 which extends radially outward from a periphery of the dome 40, and a transition area or region 42 between the dome 40 and the flange portion 41. The dome 40 has the disc convex side 27 and concave side 28 thereon, an apex or crown 43 and has a generally uniform thickness, although the thickness normally varies somewhat due to variances induced during the pre-bulging of the dome 40.

The rupture disc 18 further includes a semi-circular groove 44 which is in the transition region 42. A portion of the transition region 42 generally indicated by the reference numeral 45 has a shallow portion of the groove 44 therein and is a projected or designated hinge or tab region for the rupture disc 18 at the time of bursting. That is, upon bursting it is desired that the dome 40 tear away from the flange portion 41 along a tear area, that is, along the relatively deeper portion of the groove 44 and that portion of the transition region 42 which is coextensive with the deeper portion of the groove 44, while the tab region 45 remains intact or untorn.

Figure 3:
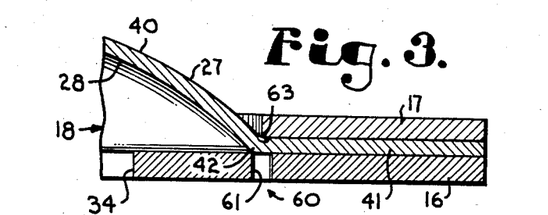
FIG. 3 is an enlarged, fragmentary cross-sectional view of the rupture disc and support rings taken along line 3—3 of FIG. 2.
Figure 4:
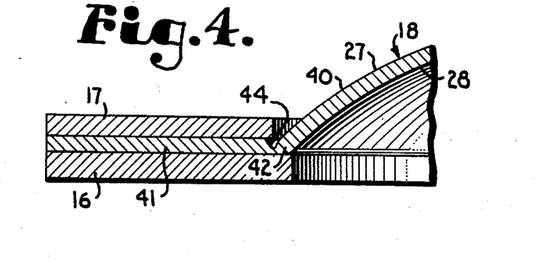
FIG. 4 is an enlarged, fragmentary cross-sectional view of the rupture disc and support rings taken along line 4—4 of FIG. 2.
Figure 6:
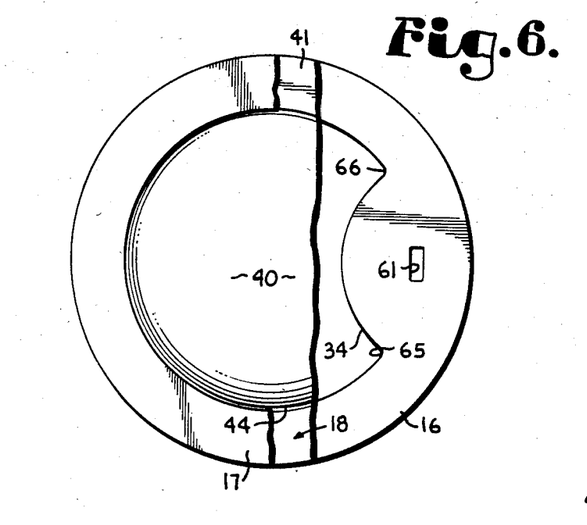
FIG. 6 is a top plan view of the rupture disc and support rings of FIG. 2 with portions broken away to show detail.
Figure 7:
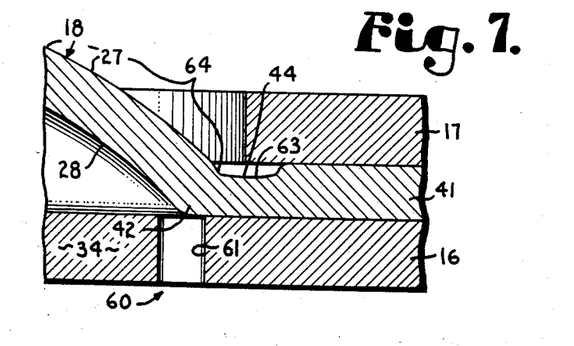
FIG. 7 is an enlarged and fragmentary cross-sectional view illustrating a groove in a transition region of the disc.
Figure 8:
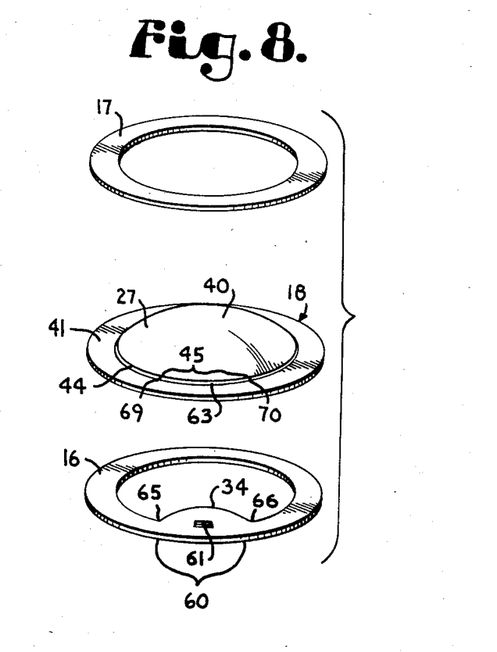
FIG. 8 is an exploded perspective view of the rupture disc and the lower support ring at a reduced scale.
Figure 9:
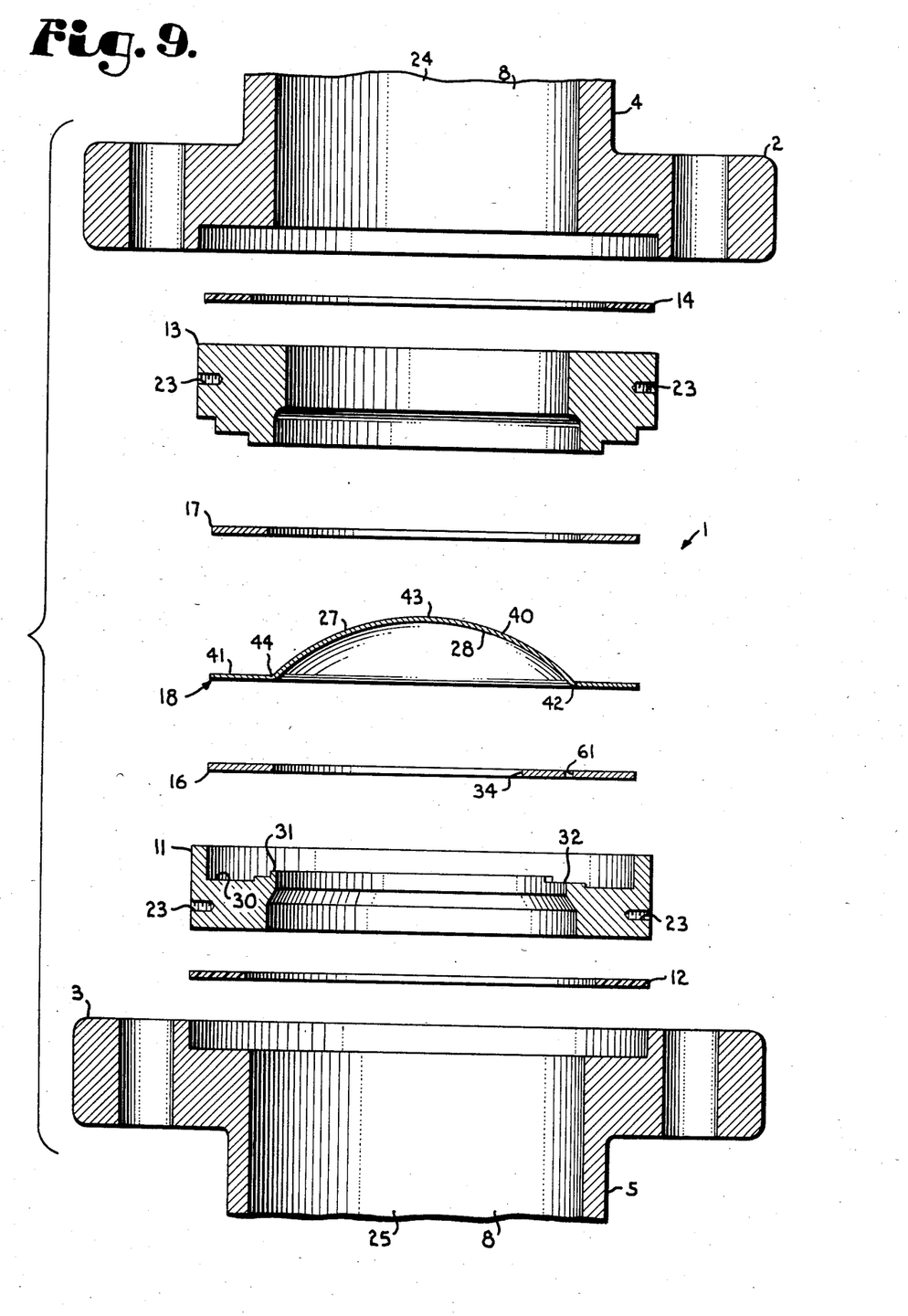
FIG. 9 is an enlarged fragmentary and exploded cross-sectional view of the assembly of FIG. 1.

FIG. 4 shows a cross-sectional view including a portion of the transition area 42 having a groove 44 therein and FIG. 3 shows a cross-sectional view of a portion of the transition region 42 with relatively shallow portions of the groove 44 associated therewith. It is noted that preferably the upstream support ring 17 extends radially outward from approximately the center of the groove 44. In contrast, the support ring 16 extends radially inward of the transition region 42 so as to support the transition region 42 at least in the portion thereof including the groove 44. The support ring 16, as is seen in FIG. 6, includes the arcuate projection 34 which is downstream of and preferably aligned with the tab region 42 such that, when the rupture disc 18 bursts the dome 40 will pivot about the hinge region 42 and engage the arcuate projection 34, as is shown in FIG. 5 wherein the ruptured and somewhat crumpled dome, as indicated by the reference numeral 46, wraps about the projection 34, especially in the area of portions of an edge 47 of the dome 46 that tore from the flange portion 41 but which were adjacent the tab region 45. The projection 34 is arcuate along its radially inward edge 48. The arcuate projection 34 has radially outward ends thereof 65 and 66 which include an arc therebetween which is generally similar to but slightly larger than the arc encompassed by the tab region 45.

The support ring 16 includes a sector 60 having a depression or discontinuity, a cut or the like, which is illustrated as an aperture 61 positioned to be located adjacent the transition region 42 when the disc 18 is positioned adjacent the support ring 16 and, in particular to be located closely adjacent a transition region portion 63. The transition region portion 63 in turn is directly adjacent that area 64 in the dome 40 wherein it is desired for buckling failure to first occur, that is, between the transition region portion 63 and the apex 43. Preferably the aperture 61 is also circumferentially generally centered between the ends 65 and 66 of the arcuate projection 34 and between ends 69 and 70 which define ends of the shallow portion of the groove 44, see FIG. 2. The radially inner and outer walls of the aperture 61 are sufficiently spaced to make sure that the transition region 42 is not supported directly adjacent the aperture 61 by the support ring 16. In this manner, the disc dome 40 is urged to selectively buckle first in the area 64.

Figure 10:
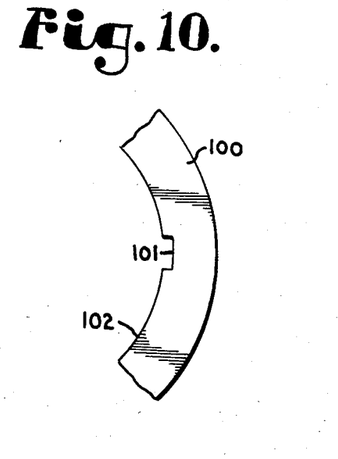
FIG. 10 is a fragmentary and top plan view of a modified support ring for a rupture disc assembly similar to the assembly shown in FIG. 1.

A fragmentary view of a modified support ring 100 is shown in FIG. 10. The ring 100 is similar to ring 16 except that it does not include an arcuate projection but does include a cut out or aperture 101 along a radially inner edge 102 thereof. The aperture 101 is positioned so as to be placed below a disc transition region (not shown) which is placed adjacent where first failure of an associated rupture disc dome is desired. Other than lacking a projection, the ring aperture 101 functions and performs very similar to the aperture 61 of the previous embodiment.

It is to be understood that while certain forms of the present invention have been illustrated and described herein, it is not to be limited to the specific forms or arrangement of parts described and shown.

What is claimed and desired to be secured by Letters Patent is as follows:

1. A reverse buckling rupture disc system comprising a reverse buckling disc including:
   (a) a centrally located pre-bulged dome having a radially outward periphery and a crown at an apex of said dome; said dome having a concave side and a convex side;
   (b) a flange joined to and surrounding said dome and extending radially outwardly therefrom;
   (c) a transition region between and integrally joining said dome and said flange;
   (d) a groove in said transition region; and
   (e) a tab area joining said dome and said flange and being defined whereat said groove has a reduced depth as compared to a remainder of said groove; and a support ring wherein:
   (f) said support ring is positioned downstream of said disc on the concave side of said dome; said ring being adjacent to and supporting substantially all of said transition region outside of said tab area; said support ring being substantially open beneath said dome such that when said disc reverses, said dome passes through said support ring; said support ring having upper and lower substantially parallel and planar surfaces; and
   (g) failure initiating means comprising a discontinuity on said support ring on the planar surface operably positioned immediately adjacent and downstream from said disc tab area and being adjacent said transition region in said tab area such that at least a part of said transition region in said tab area is not supported by said support ring prior to rupture of said disc so as to effect initial failure of said disc during rupture thereof between said tab area and said crown; said discontinuity being located within the planes of said substantially parallel and planar surfaces;
   (h) whereby when a differential pressure is applied to said dome convex side sufficient to buckle said dome, said dome starts to buckle first between said tab area and said dome crown.

2. The disc system according to claim 1 wherein:
   (a) said discontinuity comprises an axially aligned aperture in said ring.

3. The disc system according to claim 1 wherein:
   (a) said discontinuity is spaced approximately centrally with respect to said tab region and adjacent said transition region.

4. The disc system according to claim 1 wherein:

(a) said ring provides continuous and abutting support for said transition region except at said discontinuity.

5. The disc system according to claim 1 wherein:
(a) said support ring includes a projection within said planar surfaces and extending radially inwardly at a location in downstream alignment with said tab region and with said failure initiating means whereby, when said rupture disc ruptures, said dome rotates about said tab region and engages said projection.

6. The disc system according to claim 5 wherein:
(a) said projection has a radially inward surface which is arcuate in shape.

7. The disc system according to claim 6 wherein:
(a) said radially inward surface is generally semi-circular.

8. A rupture disc assembly comprising:
(a) a reverse buckling rupture disc having a pre-bulged dome with a radially outward periphery and a crown at an apex of said dome, a flange connected to the periphery of said dome and extending radially outwardly therefrom, and a transition region between said dome and said flange; said dome having a concave side and a convex side;
(b) mounting means for securing said disc in a vent such that the disc prevents passage of fluid through the vent until rupture of the disc;
(c) said mounting means including a support ring positioned on a side of said disc associated with said dome concave side; said support ring generally supporting said flange and being substantially open opposite said dome such that on reversal of said dome said dome passes through said support ring; and said support ring supporting a substantially continuous first portion of said transition region when pressure is applied to the convex side of said dome; said support ring having upper and lower substantially parallel and planar surfaces;
(d) said disc including a tab area defined thereon in a second portion of said transition region and a tear area located in a remainder of said transition region; said disc tearing in said tear area upon rupture of the disc and said tab area remaining untorn upon rupture of the disc so as to maintain said dome connected to said flange after rupture of said disc; and
(e) said support ring including buckling initiating means comprising a discontinuity therein on the planar surface generally immediately adjacent to said second portion of the transition region located in the tab area such that said discontinuity is operably positioned immediately downstream of said second portion of said transition region located in said tab area, so as to initiate original buckling of said dome between said tab area and said crown; said discontinuity being located within the planes of said substantially parallel and planar surfaces;
(f) whereby when sufficient differential pressure is applied to said dome convex side to buckle said dome, said dome first buckles between said crown and said tab region, subsequently said dome reverses and passes through said support ring and thereafter tears from said flange along said tear area.

9. The assembly according to claim 8 wherein:
(a) said discontinuity comprising an axially aligned aperture in said ring located to be generally directly downstream of said tab region; and
(b) said support ring supporting substantially all of said transition region, except that portion of the transition region directly adjacent said aperture.

10. The assembly according to claim 8 wherein:
(a) said mounting means include a projection having substantially planar top and bottom surfaces extending radially inward therefrom on the downstream side of said disc and extending radially inwardly from a position adjacent said tab region.

11. The assembly according to claim 10 wherein:
(a) said projection is arcuate and positioned on said ring within the planar surfaces thereof.

12. The assembly according to claim 10 wherein:
(a) said projection includes at least a portion of said discontinuity comprising said buckling initiating means.

13. The assembly according to claim 8 including:
(a) a groove in said transition region; said groove having a sector with a depth associated therewith; said sector being continuous and coextensive with said transition region outside of said tab region.

14. The assembly according to claim 13 wherein:
(a) said groove sector depth is between 40% and 75% of the thickness of said disc adjacent said groove sector.

15. In a reverse buckling rupture disc assembly including a disc having a centrally located pre-bulged dome with a concave side, a convex side and a crown, a flange extending radially outward from said dome and a transition region between said dome and said flange and further including a downstream support ring for supporting said disc on the concave side thereof and having a substantial opening therethrough opposite said dome; said support ring having upper and lower substantially parallel and planar surfaces; the improvement wherein:
(a) said support ring includes a failure initiating discontinuity therein on the planar surface operably positioned immediately beneath and directly adjacent a first portion of said transition area which is generally closest to a location on the dome whereat initial buckling is desired; said discontinuity being located within the planes of said substantially parallel and planar surfaces; and
(b) said support ring supports substantially all of the transition area outside said transition area first portion;
(c) whereby when said disc has sufficient differential pressure applied to said convex side to cause buckling of said dome, said dome first buckles between said dome crown and said failure initiating depression.

16. The assembly according to claim 15 wherein:
(a) said discontinuity comprises an axially aligned aperture in said ring.

* * * * *